United States Patent Office 2,848,325
Patented Aug. 19, 1958

2,848,325

FUEL ELEMENTS FOR NUCLEAR REACTORS AND PROCESS OF MAKING

William E. Roake, Richland, Wash., assignor to the United States of America as represented by the United States Atomic Energy Commission No Drawing. Application January 16, 1957
Serial No. 634,593

12 Claims. (Cl. 75—211)

This invention deals with uranium fuel elements for nuclear reactors and in particular with a process of making such fuel elements.

Metallic uranium has been used as fuel material; mostly it is used as bodies of cylindrical, rod-shaped or other elongated form. Such fuel elements, however, have the disadvantage that the crystals therein are oriented due to the fabrication methods, and if they are not subjected to a special, usually very costly treatment, the fuel elements grow in the direction of the crystal orientation when exposed to elevated temperatures as they occur in nuclear reactors. This growth causes jamming of the fuel elements which makes their removal from the reactor difficult and the operation of the reactor hazardous. It is also difficult and expensive to machine the uranium bodies to the precise dimensions required.

It has been suggested to use, instead of fuel bodies of the kind just described, an assembly composed of a plurality of small fuel granules, preferably of spherical or roughly spherical shape. In such assemblies any crystal orientation of one granule is canceled by that of another granule, since the granules are arbitrarily arranged; consequently the assembly as a whole does not exhibit any preferred growth. Granular fuel elements have been used heretofore in reactors, for instance in reactors of the type described in assignee's copending applications Serial No. 321,076, filed by Charles R. Stahl on November 18, 1952, and Serial No. 625,569, filed by Herbert H. Hyman and Joseph J. Katz on November 30, 1956.

These uranium granules used heretofore have been made by forging short lengths of uranium wire in a two-piece die or by upsetting. However, also these granules have some residual orientation which is derived from the fabrication of the wire from which the granules were made.

It is an object of this invention to provide a method of making uranium granules in which all the disadvantages described above are overcome.

It is an object of this invention to provide a method of making uranium granules which have substantially no crystal orientation within the individual granules.

It is another object of this invention to provide a method of making uranium granules which does not require any rolling or similar fabrication step by which the crystals are oriented.

It is also an object of this invention to provide a process of making uranium granules in which machining to precise dimensions is not necessary.

It is still another object of this invention to provide a process of making uranium granules by which a great number of granules can be produced simultaneously.

It is finally also an object of this invention to provide a process of making uranium granules which is simple and comparatively inexpensive.

These objects are accomplished by suspending a powdered uranium material, such as uranium hydride or metallic uranium, in an inert viscous liquid; pouring the suspension obtained in droplets on a bed of a sorbent for said liquid whereby said liquid is taken up by said sorbent and soft pellets of the uranium material are obtained, said pellets being roughly of spherical shape; heating the pellets on the sorbent bed in an oxygen-free inert atmosphere at a temperature at which said viscous liquid is volatilized; preferably further heating said pellets at a temperature of about 450° C. in an oxygen-free atmosphere for approximately from 10 to 30 minutes to increase the bond strength; sintering said pellets while still on said sorbent bed in an oxygen-free inert atmosphere at a temperature of from 1000° to 1200° C.; and cooling said pellets to room temperature.

Uranium powder is mostly made from uranium hydride by heating the latter at a reduced pressure and/or in a current of inert gas. The function between pressure and temperature to accomplish the composition is known and can be found in the literature, for example, in "Chemistry of the Hydrides" by Hurd. A temperature of about 325° C. at the required reduced pressure was the preferred operating condition. Uranium hydride, however, was preferred as the starting material to uranium powder because it is less reactive.

A great number of liquids are suitable as the suspending agent for the uranium material. In order to be satisfactory, the liquid has to be rather viscous so that the suspension is reasonably stable, and it also should not react with the uranium material. Higher alcohols and paraffin oil have been found suitable, but the latter was the preferred agent.

As the sorbent, powdered magnesium, powdered, and preferably degassed, magnesium oxide, or powdered magnesium fluoride have been found suitable; the magnesium and magnesium oxide were preferred to the fluoride.

The temperature of volatilization, of course, depends on the suspending agent used. In the case of paraffin oil a temperature of approximately 200° C. was satisfactory.

The inert oxygen-free atmosphere can be provided by various means. For instance, a current of argon gas or evacuation of the equipment in which the heating was carried out were found suitable; a combination of the two means is also satisfactory.

When uranium hydride is used as the starting material instead of uranium powder, it has to be decomposed during the process in order to arrive at metallic uranium. This is preferably done after volatilization of a suspending agent; heating at 325° C. under substantially less than atmospheric pressure as has been set forth above accomplishes the decomposition in a satisfactory way.

After the two sintering steps the pellets are cooled to room temperature. They then have a hard, strong structure and a volume about half as large as that of the pellets before sintering and after volatilization of the suspending medium. The finished, cooled pellets can then be exposed to the atmosphere without there taking place considerable oxidation.

The uranium material, whether elemental or as the hydride, can be natural uranium or it can be enriched in fissionable isotopes, such as $U^{235}$. Also other substances may be admixed to the uranium or uranium hydride powder; for instance, a material that has good moderating characteristics can be incorporated into the pellets.

It will be understood that this invention is not to be limited to the details given herein and that it may be modified within the scope of the appended claims.

What is claimed is:

1. A process of making granules of uranium metal, comprising suspending a powdered uranium material selected from the group consisting of uranium hydride and metallic uranium in a viscous liquid nonreactive with said uranium material and selected from the group consisting of higher alcohols and paraffin oil; pouring the obtained suspension in droplets on a powdered sorbent for said liquid whereby said liquid is taken up by said sorbent and soft pellets of the uranium material of roughly spherical shape are obtained, said sorbent being selected from the group consisting of magnesium, magnesium oxide and magnesium fluoride; heating the sorbent plus pellets in an inert atmosphere at a temperature at which said viscous liquid volatilizes; heating said pellets while still on said sorbent and in an inert atmosphere at from 1000° to 1200° C. whereby they are sintered; and cooling said pellets to room temperature.

2. The process of claim 1 wherein said uranium material is uranium hydride.

3. The process of claim 1 wherein said uranium material is uranium.

4. The process of claim 1 in which said viscous liquid is paraffin oil and heating for volatilization of said liquid is carried out at about 200° C.

5. The process of claim 1 wherein said viscous liquid is a higher alcohol.

6. The process of claim 1 wherein said sorbent is magnesium.

7. The process of claim 1 wherein said sorbent is degassed magnesium oxide.

8. The process of claim 1 wherein the sorbent is magnesium fluoride.

9. The process of claim 1 wherein said oxygen-free inert atmosphere is created by a stream of an inert gas.

10. The process of claim 9 wherein said inert gas is argon gas.

11. The process of claim 1 wherein said inert atmosphere is obtained by evacuation.

12. A process of making granules of uranium metal comprising suspending powdered uranium hydride in paraffin oil; pouring the obtained suspension in droplets on a bed of powdered magnesium oxide whereby said paraffin oil is taken up by said magnesium oxide and soft pellets of uranium hydride of roughly spherical shape are obtained; heating the pellets on the magnesium oxide in a current of argon gas at about 200° C. whereby said paraffin oil is volatilized; heating said pellets at about 325° C. and a reduced pressure whereby said uranium hydride is decomposed and metallic uranium is formed; heating said pellets at a temperature of about 450° C. in argon gas whereby said pellets are bonded; heating said pellets while still on said magnesium oxide and in argon gas at from 1000° to 1200° C. whereby they are sintered; and cooling said pellets to room temperature.

No references cited.